Jan. 13, 1931.  J. W. SMITH  1,788,551
MACHINE FOR ROLLING TAPERED DISKS
Original Filed Sept. 4, 1920
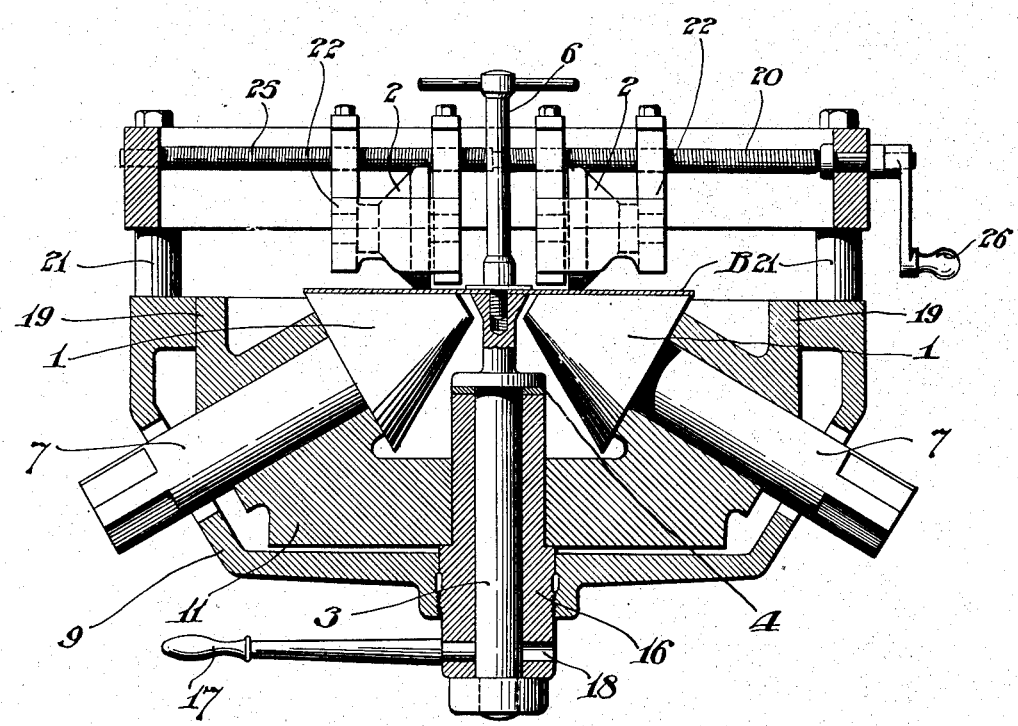
INVENTOR.
JOHN W. SMITH
BY John P. Tarbox
ATTORNEY.

Patented Jan. 13, 1931

1,788,551

UNITED STATES PATENT OFFICE

JOHN W. SMITH, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

MACHINE FOR ROLLING TAPERED DISKS

Original application filed September 4, 1920, Serial No. 408,231. Divided and this application filed October 29, 1926. Serial No. 144,954.

The invention comprises a machine for rolling suitable blanks into thin disk-like forms of any desired section and is a division of my co-pending application, Serial No. 408,231, filed September 4, 1920, for Process and apparatus for rolling metallic disks.

An object of my invention is to provide a machine in which such thin disk-like forms may be produced without the attendant buckling and distortion heretofore thought unavoidable.

Another object is the provision of a machine adapted to both hot and cold rolling, but particularly suited to the former use.

A third object is the provision of a machine by means of which a better finish can be obtained than by previous devices.

These objects are attained, and others will be made apparent by the following detailed description and the drawing which is appended.

The drawing represents somewhat diagrammatically an elevation of a form of the invention, with some parts shown in sections.

The frame 9 of the machine supports and guides a cage or holder 11 in which the rollers 1 are suitably journaled by means of their shafts 7. Guides or bars 20 (only one of which is shown) are carried by posts 21, attached to the frame. Slidably mounted on these guides are the roll carriers 22, which provide suitably journaled bearings for the rolls 2. A shaft 25, threaded right and left-handed to engage correspondingly threaded bores of the carriers 22, is journaled in members connecting the guides 20, and provided with an operating crank 26. Rotation of this shaft in one direction causes the carriers to separate; reversal causes them to approach each other.

The rolls 2 are of cylinder-conical formation, comprising a relatively narrow cylindrical tread portion, which is the active rolling surface, and a wider conical portion, for a purpose hereinafter specified.

The lower supporting rollers 1, which support and give form to the blank B being rolled, are capable of movement to and from the rolls 2 by reason of the method of supporting their housing in the frame 9. A threaded sleeve 16 is carried in a central threaded aperture of the frame. Sleeve and housing have abutting shoulders in contact, so that rotation of the sleeve, through handle 17 inserted in one of a plurality of holes 18, serves to force the housing and rollers 1 toward rolls 2 or to permit the return movement away from the said rolls 2. Rollers 1 are driven through shafts 7, by a suitable source of power, through flexible couplings of the conventional type, well known in rolling mill practice. Any suitable number of rollers 1 may be used.

A clamping device, comprising parts 3 and 6, is provided to locate the blank with respect to the rolls and to permit and guide its rotation while being rolled. Screw connections between the parts 3 and 6 produce this clamping action, while a suitable bearing of part 6 in sleeve 16 affords the necessary freedom for rotation.

Starting with rolls 2 in their inward positions, and with rollers 1 and rollers 2 separated, a blank (hot or cold) is placed in the machine and secured by the clamping means. Rollers 1 are put in motion (or continue in motion constantly) the cage is brought up to the rolls 2, and sufficient pressure applied by handle 17 to effect the desired rolling action. Rolls 2 are then separated, causing a rolling and spinning treatment of the blank which reduces it to the desired shape and finishes its upper surface.

It will be noted that rolling takes place only in a narrow zone under the cylindrical tread portions of the rolls 2. The metal is thus free to be gradually displaced without strain or buckling. In this device, as distinguished from that claimed in the parent application, the amount of metal undergoing working at any given time, is still less, given the same size of metal-working rolls 2. This is due to the use of a roller, instead of a platen or turn-table as a support. The theoretical contact is therefore along two short, narrow lines on opposite sides of the disk. As the free edge of the blank curls upward during the process, it is guided and gradually flattened by the conical portions of the rolls 2.

It will further be noted that the actual contact of the blank with the rolls occurs under the narrow cylindrical portion of the rolls 2. Thus there is little opportunity for the rapid conduction of heat from the blank (when a heated blank is to be rolled) through having large areas of contact with adjacent masses of cold metal.

From the foregoing description it is apparent that the lower rollers 1 determine the finished shape of the disk. Therefore, the substitution of one set of lower rolls for another will cause a corresponding change in the product, and thereby the resulting disk can be made of any desired configuration.

While a specific form of the invention has been illustrated and described, the invention is not to be limited thereto, but only by the scope of the appended claims.

I claim:

1. A rolling mill comprising a conical roller for supporting a relatively thin blank to be rolled and fixed radially as respects the axis of the blank and a narrow faced roll traversible radially over said blank to simultaneously roll and spin the blank.

2. A machine substantially as described, comprising separable narrow faced rolls, simultaneously movable in opposite directions along a diameter of the relatively thin disk to be rolled to spin and roll the same, and conical rollers each opposed to one of the said rolls and having elements of their conical surfaces substantially aligned, and fixed radially as respects the axis of the disk to be rolled.

3. A mill for rolling relatively thin metal blanks comprising a pair of narrow-treaded rolls transversible radially of the blanks to roll and spin the same, each of said rolls having a conical portion adjoining its narrow tread, supporting means for said rolls permitting their mutual separation and approach, means for presenting and rotating a blank disk for treatment by said rolls comprising a cage bearing conical rollers having elements of their faces defining the surface to which one side of the blank disk is to be formed and relatively fixed radially as respects the axis of the blank, and means for driving said conical supporting rollers and causing them to approach and separate from the said rolls.

In testimony whereof he hereunto affixes his signature.

JOHN W. SMITH.